Figure 1:
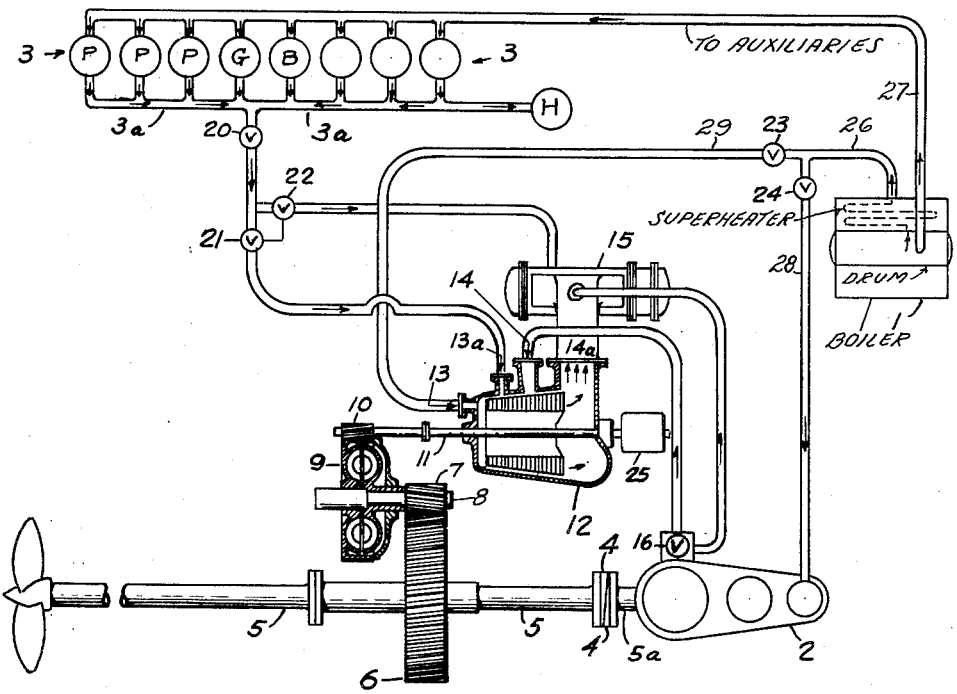

Dec. 15, 1953     O. J. BAGGERUD     2,662,369
MIXED PRESSURE TURBINE ENGINE COMBINATION
Filed Jan. 28, 1949

INVENTOR
OSCAR J. BAGGERUD
BY Cornelius Zabriskie
ATTORNEY

Patented Dec. 15, 1953

2,662,369

UNITED STATES PATENT OFFICE 2,662,369

MIXED PRESSURE TURBINE ENGINE COMBINATION

Oscar J. Baggerud, Jersey City, N. J.

Application January 28, 1949, Serial No. 73,243

4 Claims. (Cl. 60—21)

This invention relates to marine power plants and methods of operating the same and is adapted, more particularly, to the employment of the invention in steam-propelled vessels which, as initially constructed and powered, do not have the necessary speed and economy to meet the requirements of commerce.

For example, the so-called "Liberty ships," built during wartime, were powered with triple expansion reciprocating engines because these were most readily available. The boilers used therein were generally more than ample for such engines. As a result, although there was plenty of steam available, the particular engines employed were such as to drive the vessel at relatively slow speeds. Commercial, peace-time operation of these ships makes it highly desirable to increase their speed and economy of operation. This, in many cases, could be accomplished by the installation of new engines and boilers, but the installation of this type of equipment not only entails very considerable expense but also may cut down cargo space which is undesirable.

The main object of the present invention is to provide additional power output in conjunction with the existing plant for increased speed and to secure economy at all speeds.

Other objects are to provide additional power plant machinery at a low first cost, to provide additional power plant machinery of small size which may be readily installed in existing engine rooms without extensive changes, and to provide a safe and flexible power plant under all operating conditions, including port operation.

I accomplish this purpose by boosting the steam generation and the steam temperature of the boilers for utilization in the engine and in a high speed multi-stage turbine, which also receives exhaust steam from the low pressure cylinder of the reciprocating engine and excess auxiliary exhaust from the steam driven auxiliaries, all at appropriate stages. The turbine is connected to the propeller shaft by any appropriate gearing and through any appropriate clutch, such, for example, as a hydraulic coupling, to boost the power on the propeller shaft. The flanged crank-shaft of the reciprocating engine is directly connected to the flanged propeller shaft by bolts. Between the two flanges are inserted two wedges which, when removed, will permit the disconnection of the engine from the propeller shaft, if desired for any reason. Thus the turbine may run alone in driving the propeller shaft or together with the engine. The turbine also may be disconnected from the propeller shaft by emptying the clutch, whereby the engine alone may be utilized to drive the propeller shaft. The turbine may also be used to drive an electric generator, attached to the turbine shaft by a clutch, which may be used for augmenting the electric power output at sea and in port. In port, the turbine receives steam from the boilers and from the auxiliary exhaust line which receives a large quantity of exhaust steam from the auxiliaries. The turbine is then segregated from the propeller shaft by emptying the clutch.

Under normal full power the turbine takes steam from the boilers, exhaust from the low pressure cylinder of the reciprocating engine and excess auxiliary exhaust from the auxiliary exhaust line, and exhausts to the condenser, which it does under any running condition. When the reciprocating engine is running alone the engine exhausts directly to the condenser.

Features of the invention, other than those adverted to, will be apparent from the hereinafter detailed description and appended claims when read in conjunction with the accompanying drawing.

The accompanying drawing illustrates one practical embodiment of the invention, but the construction therein shown is to be understood as illustrative, only, and not as defining the limits of the invention.

Figure 1 of the drawing is a schematic showing of a power plant embodying the present invention.

Figures 2, 3:
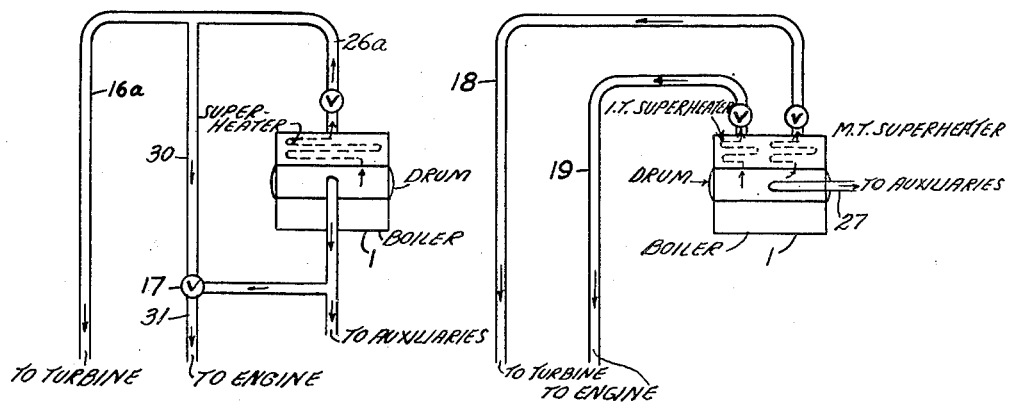

Figures 2 and 3 are fragmental views schematically showing boilers with different types of superheaters for obtaining different temperatures to engine and turbine and the arrangement of piping connections to such boilers.

In Figure 1 of the drawing, I designates the boiler, 2 a reciprocating engine, and 3 the auxiliaries. There are a great many of these auxiliaries used on a steam propelled vessel and they are operated by steam supplied from the boiler I through line 27. Among such auxiliaries, I have shown for the purpose of illustration, several pumps P, a generator G, a blower B, etc., and deck driven auxiliaries. The flanged propeller shaft is designated 5 and is connected to the flanged crank shaft 5a by bolts. In between the flanges are inserted two wedges 4, which can be removed without disturbing the alinement of the shafting. Thus the engine 2 may be disconnected from the propeller shaft 5 when desired.

Fixed to the propeller shaft is a gear 6 driven by a pinion 7, mounted on the shaft 8 of a conventional hydraulic coupling 9. The coupling is in turn driven from a pinion 10 fixed on the shaft 11 of a multi-stage turbine 12. This multi-stage turbine has an inlet 13 for high pressure steam, an inlet 13a for intermediate pressure steam, and an inlet 14 for low pressure steam. The total exhaust steam from the turbine is discharged to the condenser 15 through outlet 14a.

The boiler, engine and auxiliaries are connected to the several inlets 13, 13a and 14 of the turbine in a manner appropriate to the steam pressures to be delivered from these several sources to the several stages of the turbine. For the purpose of illustration, however, I have shown the boiler directly connected by pipe lines 26, 29 to the inlet 13, the engine connected by pipe line 28, the auxiliaries connected to the inlet 13a, and the low pressure cylinder of the engine connected to the inlet 14. The low pressure cylinder of the engine is also directly connected to the condenser 15 with a valve 16 to control the passage of the steam from the engine to either the turbine or the condenser, as may be desired.

Figure 2 shows another method of extracting steam from the boiler to the turbine and engine. In Figure 1 superheated steam of moderate superheat is directed from the superheater outlet 26 to the engine through line 28 and to the turbine through line 29. In Figure 2, superheated steam of high temperature is fed from a superheater, with which the boiler is equipped, through line 26a and 16a to the turbine inlet 13, and through line 30 to a mixing valve 17, to mix superheated steam through line 31 with saturated steam from the boiler drum and convey the mixed steam to the reciprocating engine 2.

In Figure 3, a boiler is employed having a superheater adapted to deliver steam at relatively high temperatures and also superheated steam at a more moderate temperature. Superheated steam of high temperature (H. T.) is extracted from the high temperature section of the boiler superheater and led through line 18 to turbine inlet 13, while superheated steam of the more moderate temperature (M. T.) is extracted from the moderate temperature section of the boiler superheater and led through line 19 to engine 2. Figure 3 is the preferred arrangement. These arrangements are based on the fact that increased steam temperatures in steam to engines and turbines increase the economy of operation.

Some exhaust steam from the several auxiliaries 3 may be utilized to e. g., preheat boiler feed water at H, while the excess of such auxiliary exhaust is admitted through a back pressure valve 20, set at an appropriate pressure, and through valve 21 to inlet 13a. When not admitted to the turbine, this excess auxiliary exhaust is directed through valve 22 to the condenser. Valves 21 and 22 are interlocked so that when one is open, the other is closed. Cut-out valves 23 and 24 are provided at boiler for cutting out the lines as desired. A generator 25 is attached to the turbine shaft for augmenting the electric power and light at sea and in port.

My system may be operated to carry out the preferred method of this invention, as follows:

Full power: High temperature steam is fed as shown in Fig. 3, from boiler 1 through line 18 to inlet 13 of the turbine 12, moderate temperature steam is fed through line 19 to engine 2, which exhausts through valve 16 to inlet 14 of the turbine, and excess auxiliary exhaust from the auxiliary exhaust line 3a is directed through valves 20 and 21 to inlet 13a of the turbine 12. Exhaust from the turbine is discharged to the condenser 15. Both the turbine and engine drive the propeller shaft. The drive from the engine is direct through the flanged connection of the crank shaft 5a and the propeller shaft 5, and from the turbine through elements 10, 9, 7 and 6. The turbine 12 drives generator 25.

Intermediate power: High temperature steam to turbine 12 is cut off. Moderate temperature steam is fed through line 19 to engine 2, which exhausts through valve 16 to inlet 14 of the turbine 12, and excess auxiliary exhaust from the auxiliary exhaust line 3a is directed through valves 20 and 21 to inlet 13a of the turbine 12. Exhaust from the turbine is discharged to the condenser 15. Both the turbine and engine drive the propeller shaft 5 through the same connections as in full power. The turbine 12 drives the generator 25.

Low power and manoeuvering: The turbine 12 is disconnected from the propeller shaft 5 by emptying the clutch 9. The engine 2 here serves as the sole driving agency for propeller shaft 5. The turbine may be used as under port condition, if required.

Special condition: High temperature steam, maximum flow, is fed through line 18 to inlet 13 of the turbine and moderate temperature steam is fed through line 19 to engine 2, which exhausts through valve 16 to the condenser 15 directly, and excess auxiliary exhaust from the auxiliary exhaust line 3a is directed through valves 20 and 21 to inlet 13a of the turbine 12. Exhaust from the turbine escapes to the condenser 15. Both the turbine and engine drive the propeller shaft 5 through the same connections as in full power. The turbine 12 drives generator 25.

Port condition: The engine 2 is shut down and the turbine 12 disconnected from propeller shaft 5 by emptying clutch 9. High temperature steam is fed from boiler through line 18 to inlet 13 of the turbine, and excess auxiliary exhaust from the auxiliary exhaust line 3a is directed through valves 20 and 21 to inlet 13a of the turbine 12, driving generator 25.

This invention is particularly adapted for use in improving existing power plants, but it may also be employed in an entirely new power plant. In this application, the term "boiler" is to be understood as denoting either one or more boilers.

The foregoing detailed description sets forth the invention in its preferred practical form, but the invention is to be understood as fully commensurate with the appended claims.

This application is a continuation-in-part of my application Serial No. 588,301, filed April 14, 1945 on "Power Plant," now abandoned.

Having thus fully described the invention, what I claim as new and desire to secure by Letters Patent is:

1. In a power plant for steam-propelled vessels, a boiler having a drum and a steam outlet therefrom, a superheater connected with said boiler and having two outlets connected thereto, one outlet being located at a point of high temperature of the superheater and the second outlet located at a point of lower temperature, a reciprocating engine having high and low pressure stages, a plurality of auxiliaries and a multi-stage turbine, a plurality of valved piping connections disposed between the boiler engine, auxiliaries, and multi-stage turbine, and means for connecting the outlet located at the high temperature portion of the superheater to the high temperature portion of the turbine, and means for connecting the outlet located at the lower temperature portion of the superheater directly to said high pressure stage of said reciprocating engine, and means including said piping for connecting the boiler drum outlet directly to said auxiliaries, and means including said piping for connecting the low pressure end of said reciprocating engine and the exhaust end of said auxiliaries with other stages of said multi-stage turbine, whereby the power and efficiency of the plant can be increased over that of the reciprocating engine.

2. In a power plant for steam propelled vessels, a boiler, a boiler drum having a steam outlet connected therewith a superheater connected with said boiler, steam outlets from said superheater at the highest temperature zone and an intermediate temperature zone thereof, a reciprocating engine having high and low pressure stages, a plurality of auxiliaries and a multi-stage turbine, a plurality of valved piping connections disposed between the boiler, engine, auxiliaries and multi-stage turbine, means for connecting the high temperature outlet of the superheater through one of said valved piping connections directly with the high pressure stage of said multi-stage turbine, and means for connecting the intermediate temperature outlet of the superheater through other of said valved piping connections with the high pressure stage of said reciprocating engine, an outlet from the boiler drum to said auxiliaries, and means including said piping for connecting the low pressure exhaust ends of said reciprocating engine and said auxiliaries with other stages of said multi-pressure stage turbine, whereby the power and efficiency of the plant can be increased over that of the reciprocating engine.

3. In a power plant for steam propelled vessels, a boiler having a boiler drum and superheater provided with a suitable steam outlet, an engine, a plurality of auxiliaries and a multi-stage turbine having steam inlets at different stages, an outlet from the boiler drum to said auxiliaries, a plurality of valved piping connections disposed between said boiler, engine, auxiliaries, and turbine, a propeller shaft, a detachable connection between said propeller shaft and said engine, speed reducing driving connections between the turbine and the propeller shaft, means including valved piping for connecting the superheater directly to the engine, means including valved piping connecting the superheater directly to one stage of the turbine, means including valved piping connecting the exhaust end of the steam engine to another stage of the turbine, and means including valved piping connecting the exhaust ends of the auxiliaries to still another stage of said turbine, a condenser, means including valved piping connecting the exhaust end of the engine, the auxiliaries, and the turbine with the condenser, and the detachable connection between the propeller shaft and engine, all being selectively operable, to permit the propeller shaft to be driven from the engine alone, the engine and turbine conjointly, or from the turbine alone, and to permit said turbine to be driven solely from steam supplied directly from the boiler or by steam directly from the boiler and the auxiliaries and engine exhaust.

4. In a power plant for steam propelled vessels, a plurality of steam actuated auxiliary units, a propeller shaft, a steam engine and a multi-stage turbine both connected to said shaft to collectively drive the same, a boiler including a boiler drum having a steam outlet, a superheater provided with a plurality of steam outlets located in high temperature and intermediate temperature zones thereof to deliver from different parts of said superheater steam at different temperatures, means including valved piping connecting the boiler drum outlet to the auxiliaries, means including valved piping connecting the outlet located in said high temperature zone of the superheater of said boiler directly to the turbine, and means including valved piping connecting the outlet of the intermediate temperature zone of said superheater directly to the engine whereby the propeller shaft is simultaneously driven by the high temperature superheated steam impressed on the turbine and by the superheated steam of lower temperature fed to the engine and valved piping connections from the exhaust of the steam-actuated auxiliaries connected to the turbine to augment the power of the engine to drive the propeller shaft.

OSCAR J. BAGGERUD.

References Cited in the file of this patent

UNITED STATES PATENTS

| Number | Name | Date |
|---|---|---|
| 1,008,532 | Curtis et al. | Nov. 14, 1911 |
| 1,150,250 | Curtis et al. | Aug. 17, 1915 |
| 1,531,202 | Lösel | Mar. 24, 1925 |
| 1,933,041 | Bauer | Oct. 31, 1933 |
| 2,007,032 | Wach | July 2, 1935 |
| 2,404,938 | Armacost et al. | July 30, 1946 |

FOREIGN PATENTS

| Number | Country | Date |
|---|---|---|
| 367,626 | Great Britain | Feb. 25, 1932 |
| 477,901 | Great Britain | Jan. 10, 1938 |